(12) United States Patent
Marquez, Jr.

(10) Patent No.: US 12,483,014 B2
(45) Date of Patent: Nov. 25, 2025

(54) CONDUIT INTEGRITY SYSTEM

(71) Applicant: Juan Luis Marquez, Jr., Albuquerque, NM (US)

(72) Inventor: Juan Luis Marquez, Jr., Albuquerque, NM (US)

( * ) Notice: Subject to any disclaimer, the term of this patent is extended or adjusted under 35 U.S.C. 154(b) by 362 days.

(21) Appl. No.: 18/091,305

(22) Filed: Dec. 29, 2022

(65) Prior Publication Data

US 2023/0216283 A1    Jul. 6, 2023

Related U.S. Application Data

(60) Provisional application No. 63/295,335, filed on Dec. 30, 2021.

(51) Int. Cl.
*H02G 3/04* (2006.01)
*F16L 43/00* (2006.01)
*F16L 57/06* (2006.01)

(52) U.S. Cl.
CPC ............ *H02G 3/0462* (2013.01); *F16L 43/00* (2013.01); *F16L 57/06* (2013.01)

(58) Field of Classification Search
CPC ......... H02G 3/0462; F16L 43/00; F16L 57/06
See application file for complete search history.

(56) References Cited

U.S. PATENT DOCUMENTS

| | | | | |
|---|---|---|---|---|
| RE31,020 E | * | 8/1982 | Funk | F16L 57/06 228/122.1 |
| 4,684,155 A | * | 8/1987 | Davis | B65G 53/523 138/DIG. 6 |
| 4,865,353 A | * | 9/1989 | Osborne | F16L 57/06 285/55 |
| 2008/0179877 A1 | * | 7/2008 | Pyron | H02G 3/081 285/94 |
| 2012/0065622 A1 | * | 3/2012 | Cornish | A61M 25/09 604/528 |

* cited by examiner

*Primary Examiner* — Seahee Hong
(74) *Attorney, Agent, or Firm* — LOZA & LOZA, LLP; Kevin L. Soules

(57) ABSTRACT

A system, method, and apparatus for preventing friction based damage to wire conduit comprises a protecting surface configured on or in sections of conduit prone to wire friction as wire is pulled through the conduit.

20 Claims, 4 Drawing Sheets

CONDUIT INTEGRITY SYSTEM

CROSS REFERENCE TO RELATED PATENT APPLICATIONS

The present application claims the priority and benefit under 35 U.S.C. § 119(e) of U.S. Provisional Patent Application Ser. No. 63/295,335 filed Dec. 30, 2021, entitled "CONDUIT INTEGRITY SYSTEM." U.S. Provisional Patent Application Ser. No. 63/295,335 is herein incorporated by reference in its entirety.

TECHNICAL FIELD

Embodiments are generally related to the field of construction. Embodiments are also related to the field of electronics. Embodiments are further related to the field of electrical construction. Embodiments are further related to raceways and conduit assembly. Embodiments are further related to methods and systems for preventing damage to conduit during the installation of wiring.

BACKGROUND

Electrical pathways are required in every structure with electricity. Modern coding has increased the safety of electrical systems by requiring various safety measures to ensure wiring does not create hazards including, but not limited to, fire hazards, or electrical shock hazards.

One common construct for running wiring includes the use of conduit. Conduit can be an insulator selected to be resistant to many forms of corrosion or degradation over time. This makes it ideal for protecting electrical wires therein.

While conduit offers an excellent means for protecting wire runs it also has some notable practical drawbacks. Chief among these, is that conduit is often inflexible. The most common form of conduit is polyvinyl chloride (PVC) which is rigid. In most applications the chases to various locations in or out of a structure require bends and curves. The solution is the use of angled conduit sections to direct the conduit to the desired locations.

While angled conduit can solve the problem of routing wire through complex paths, it creates an ancillary problem. After conduit is installed, wire is pulled through the conduit from one end to the other. Very little friction between the wire and conduit is required to create a groove, or even a slit through the conduit. Because of the complex paths in the conduit, and associated bends, there are numerous points in most runs where the wire is in contact with the conduit as it is being pulled. Often the friction between the wire and the conduit, particularly at bends in the conduit, creates grooves or penetrations in the conduit. These grooves or penetrations compromise the integrity and safety of the wire chases. Such penetrations are common during wire installation. When they occur, the entire section of conduit must be removed and replaced. In aggregate this results in significant inefficiency and expense.

As such, there is a need in the art for simple, cost effective systems and methods for protecting conduit during wire installation, as disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for installing wiring.

It is another aspect of the disclosed embodiments to provide a method and system/apparatus for installing conduit and associated wiring.

It is another aspect of the disclosed embodiments to provide a method and system or apparatus for protecting conduit as wires are pulled through the conduit.

It is another aspect of the disclosed embodiments to provide methods, systems, and apparatuses for a protective finishes and lubrications applied to the interior surfaces of sections of conduit to prevent damage to the conduit.

The aforementioned aspects and other objectives and advantages can now be achieved as described herein. For example, in an embodiment, a system comprises a section of conduit and at least one protecting surface configured on an inner surface of the section of conduit. In an embodiment, the section of conduit further comprises a bend between a first end and a second end in the section of conduit. In an embodiment, the section of conduit further comprises a polyvinyl chloride tube. In an embodiment, the system comprises an insert notch in a surface of the section of conduit, wherein the at least one protecting surface is configured in the insert notch. In an embodiment, the at least one protecting surface comprises at least one of hard plastic, polyvinyl chloride, resin, epoxy, metal, fiberglass, Kevlar, carbon fiber, cloth, leather, ceramic, rubber, glass, wood, and stone. In an embodiment, the system further comprises a lubricating coating disposed on the protecting surface. In an embodiment, the at least one protective surface comprises a surface of a thickness between $1/64$ inch and $1/2$ inch. In an embodiment, the protective surface is configured on an inner curve of the section of conduit. In an embodiment, the system further comprises an indicator material configured beneath the at least one protecting surface. In an embodiment, the indicator material comprises at least one of a paint layer, dye packet, and dye layer. In an embodiment, the section of conduit is configured for instillation of wire in a building.

In another embodiment, a conduit protection system comprises a section of conduit, a protecting surface configured on an inner surface of the section of conduit, and an insert notch in the section of conduit, wherein the protecting surface is configured in the insert notch. In an embodiment, the section of conduit further comprises a bend between a first end and a second end in the section of conduit. In an embodiment, the section of conduit further comprises a polyvinyl chloride tube. In an embodiment, the protecting surface comprises at least one of: hard plastic, polyvinyl chloride, resin, epoxy, metal, fiberglass, Kevlar, carbon fiber, cloth, leather, ceramic, rubber, glass, wood, and stone. In an embodiment, the system comprise a lubricating coating disposed on the protecting surface. In an embodiment, the protective surface is configured on an inner curve of the section of conduit.

In another embodiment, a method for protecting conduit during wire installation comprises selecting at least one section of a conduit with a protecting surface, installing a conduit wire chase wherein the at least one selected section of conduit is installed, and pulling wire through the conduit wherein the protecting surface prevents damage to the conduit. In an embodiment the method for protecting conduit during wire installation further comprises identifying an indicator on the wire deposited by an indicator material configured beneath the at least one protecting surface. In an embodiment of the method for protecting conduit during wire installation, the protecting surface comprises at least one of: hard plastic, polyvinyl chloride, resin, epoxy, metal, fiberglass, Kevlar, carbon fiber, cloth, leather, ceramic, rubber, glass, wood, and stone.

BRIEF DESCRIPTION OF THE FIGURES

The accompanying figures, in which like reference numerals refer to identical or functionally similar elements throughout the separate views and which are incorporated in, and form a part of the specification, further illustrate the embodiments and, together with the detailed description, serve to explain the embodiments disclosed herein.

DETAILED DESCRIPTION

Figure 1A:
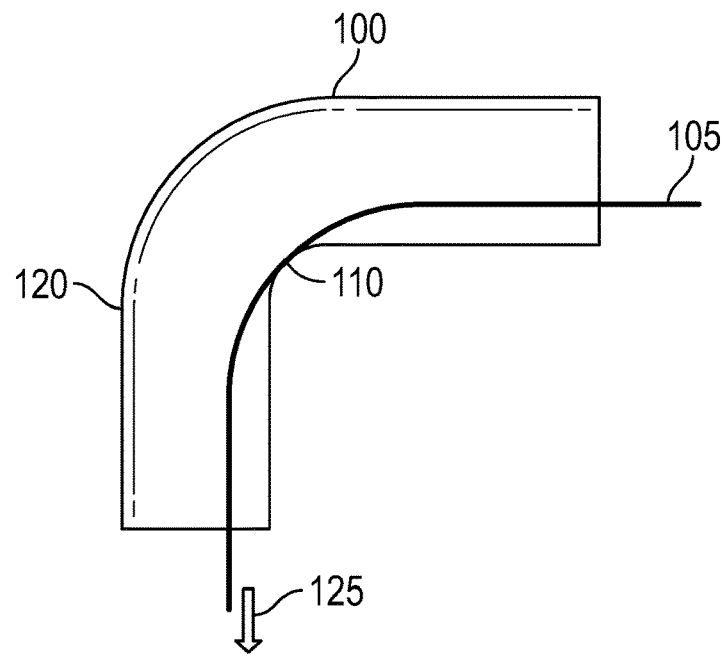
FIG. 1A depicts a conduit with wire therein, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. All aspects of the various embodiments can be interchangeable with aspects disclosed in other embodiments, and/or can be incorporated in other embodiments.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Figure 1B:
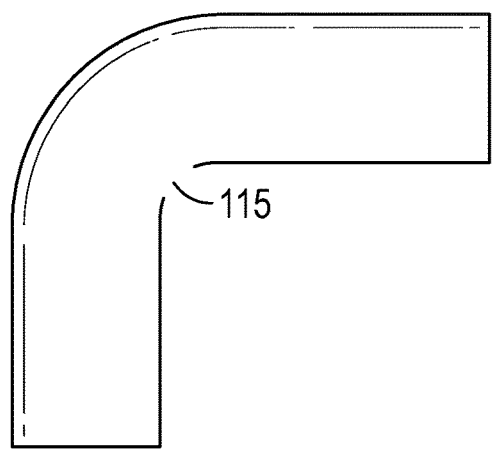
FIG. 1B depicts damage to conduit.
Figure 1C:
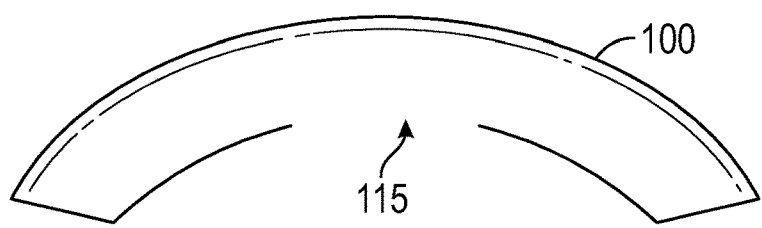
FIG. 1C depicts damage to conduit.

In certain embodiments, a system for protecting the interior surfaces of conduit from friction based degradation is disclosed. FIGS. 1A-1C illustrate a standard PVC conduit 100 with elbow 120. As illustrated in FIG. 1A, a wire 105 can be pulled through the PVC conduit 100, as illustrated by arrow 125. This creates friction at friction point 110. The friction at friction point 110 can create a groove, channel, hole, or other such deformation 115 of the PVC as illustrated in FIG. 1B. FIG. 1C. It should be appreciated that FIGS. 1A-1C illustrate a section of a conduit for purposes of illustration, but that a full wire pathway could comprise multiple sections of conduit joined at various points, or a single conduit with multiple bends.

Figure 2A:
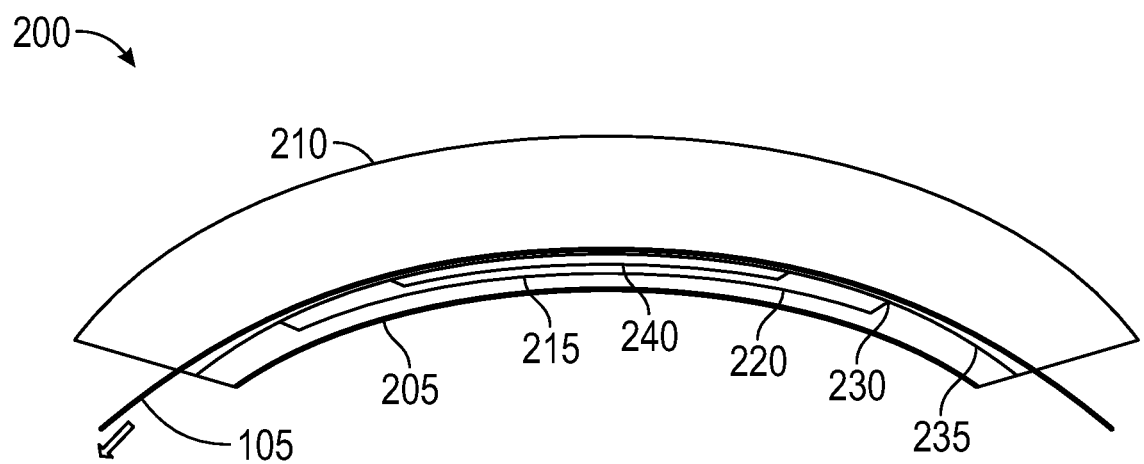
FIG. 2A depicts a cross-sectional view of a conduit protecting system, in accordance with the disclosed embodiments.

FIG. 2 illustrates a conduit protection system 200, in accordance with the disclosed embodiments. As illustrated in FIG. 2, a curved section 205 of a conduit 210 can be configured with a protecting surface 215. In certain embodiments, the conduit 210 can comprise PVC conduit, although in other embodiments, other conduit materials are possible. The disclosed embodiments can include any prefabricated conduit, for example, for installation as wire chases.

The protecting surface 215 can be selected to be a hard material with a surface that is resistant to degradation from friction created by a wire 105. In certain embodiments, the protecting surface can comprise hard plastic, polyvinyl chloride, resin, epoxy, metal, fiberglass, Kevlar, carbon fiber, cloth, leather, ceramic, rubber, glass, wood, or stone. In other embodiments, other materials can be used. The material can be selected to provide a desirable strength to weight ratio, and can be selected to be resistant to friction induced degradation.

In certain embodiments, a sacrificial layer 240 can be configured on the protecting surface 215. During use, the sacrificial layer 240 can be compromised from friction as the wire is pulled. The sacrificial layer 240 may be damaged or removed from friction with the wire, but the underlying surfaces can remain intact.

In certain embodiments, an insert notch 220, can be formed along a curved section 205 of the conduit 210. The insert notch 220 can be sized to allow a volume of the protecting surface 215 to fit therein, such that the rim 230 of the of the protecting surface 215 is substantially flush with the inner surface 235 of the conduit 210.

Figure 2B:
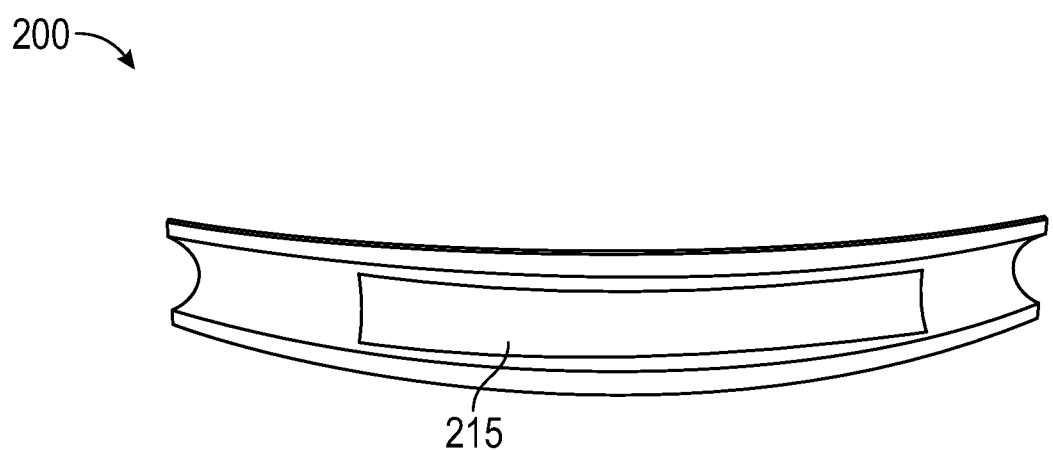
FIG. 2B depicts another view of a conduit protecting system, in accordance with the disclosed embodiments.

FIG. 2B illustrates another view of a protecting surface 215, embodied as metal, in accordance with the disclosed embodiments. The conduit protection system 200 is shown with the top half of the conduit 210 removed for purposes of illustration, so that the protecting surface 215 is visible on the inner surface 235 of the curved section 205 of the conduit 210.

Figure 2C:
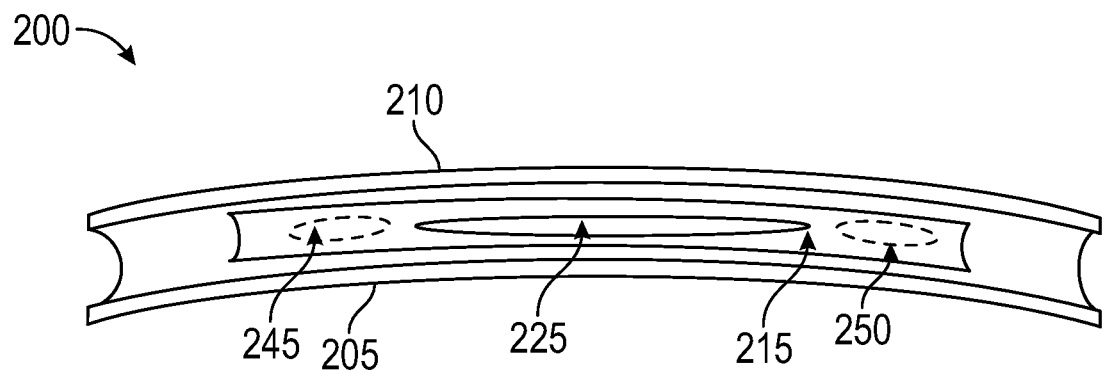
FIG. 2C depicts a top view of a conduit protecting system, in accordance with the disclosed embodiments.

In certain embodiments, a lubricating layer 225 can be formed on the protecting surface 215, wire 105, and/or the conduit 210 to reduce the friction experienced by the protecting surface 215, and consequently reduce the likelihood of damage to the conduit 210, as illustrated in FIG. 2C.

The most vulnerable part of a conduit 210 is the curved portion 205 because that is where high friction between the wire 105 and conduit 210 is most likely. However, it should be appreciated that the protecting surface 215 can be selected to cover any portion of the conduit 210, and can be selected to cover only certain portions of the conduit 210 according to design considerations. For example, the protecting surface 215 can be selected to cover only a selected portion of the inner radial surface 235 of the conduit 210 at a curve 205, bend, turn, or other such non-linear section. In other embodiments, the protective surface 215 can cover some or all of the inner surface 235 of the conduit 210 for a selected length. In other embodiments, the entire inner surface 235 of the conduit 210 can be covered with the protective surface 215. Considerations for selecting which inner surfaces 235 in the conduit 210 can include, expected friction at that point, distance from the beginning of the wire chase, location of the conduit section, weight of the conduit section, and cost.

FIG. 2C illustrates a view of the conduit 210, with the upper half removed, in order to illustrate aspects of the disclosed embodiments. As illustrated, the protecting surface 215 can cover a cross-section of the conduit 210 along an angle, bend, offset, or other desired section of the conduit 210. In an exemplary embodiment, the protecting surface 215 can comprise a metal plate configured to prevent wire friction from damaging the conduit 210. A lubricating coating 225 can be provided on the surface of the metal plate to reduce the friction created by pulling wire 105 through the offset.

In certain embodiments an indicator 245 comprising a paint layer, dye packet, dye layer, or other indicator can be configured below the protecting surface 215 and/or on or in the conduit 210. If the wire 105 penetrates the protecting surface 215, the underlying indicator 245 (e.g., paint layer, etc.) can leave a mark on the wire as it passes. If the indicator 245 is visible on the wire, it can be indicative of the fact that the wire 105 has breached the protecting surface 215 and/or the conduit 210. In certain embodiments, other indicators 250 such as textured surfaces can provide auditory, or visual evidence that a breach has occurred, and can be configured below the protecting layer 215 and/or in or on the conduit 210.

Figure 3:
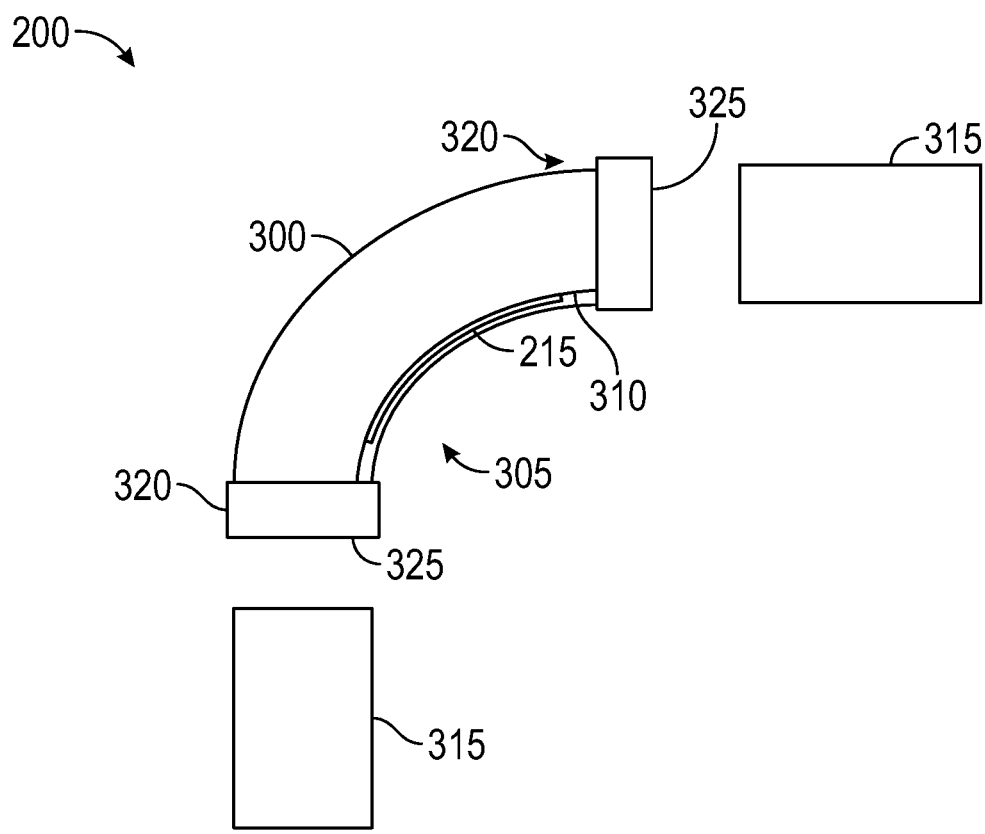
FIG. 3 depicts an insert section of a conduit protecting system, in accordance with the disclosed embodiments.

It should be appreciated that in certain embodiments, the system 200 can comprise a conduit insert section 300, such as an elbow, bend, or offset section of conduit, as shown in FIG. 3. In such embodiments, the protecting surface 215 can be selected to cover a portion 305 of inner surface 310 radius of the insert section 300.

The insert section 300 can be connectable to other sections of conduit 315. As such, the ends 320 of the insert section 300 can have a connection interface 325. The connection interface 325 can be threaded to mate with threads on the other conduit sections 315; can be smooth with a diameter configured to mate with the other conduit sections 315; or can have belled ends. In practice, the insert section 300 can be used during installation as necessary where wiring runs require curves or angles, to prevent damage to the conduit at those points.

The insert sections 300 can be prefabricated for use in various diameters, lengths, materials, and with varying connection interfaces, to work with standard conduit installations. Likewise, the insert sections can be prefabricated with protecting surfaces 215 of varying shapes, sizes, and materials, as necessary for specific applications.

For example, for short wire runs with a single gentle curve, the insert section 300 can be configured with a low volume of low density protecting surface, such as aluminum, over a limited section of the curve. This allows the insert to be low cost, and lightweight as required for a simple installation, where low friction is expected. By contrast, for a complicated chase with multiple bends at dramatic angles, the insert sections 300 can be selected to have thicker higher density protecting surfaces, with additional lubricating coatings to provide maximum protection for the expected higher friction required to pull wire through the insert section.

It should be appreciated that various parameters for the protecting surfaces can be selected for various parts of the same wire run. For example, the first offset in a run with numerous offsets will experience the most friction since this section must accommodate friction from nearly the entire wire. By contrast, the last offset will experience the least friction since this section will only accommodate a small portion of the wire (that portion from the offset to the conduit exit). As such, the thickness of the protecting surface at the first offset can be selected to be the most protective, and some or all of the remaining offsets can be less thick, maximizing protection, while minimizing total cost.

In certain embodiments, the protecting surface 215 can be a coating such as a metal coating, paint coating, or other such coating, sprayed or sputtered on the inner surface of the conduit at a location where wire friction is expected. In exemplary embodiments, the protecting surface can be between $1/64"$-$1/2"$.

In other embodiments, the protecting surface 215 can be cast, molded, machined, or otherwise deposited in or on the conduit. It can be manufactured to be straight or curved to a degree or radius. It should be noted that the embodiments can be applicable for any diameter conduit. It should be appreciated that conduits can be manufactured in straight pieces (typically in 10 ft or 20 ft lengths) or spooled in any continuous length (e.g., a 1000 ft spool) and then custom bends can be added with tools or conduit bending techniques can be applied on site. Accordingly, in certain embodiments, the protecting surface 215 can be embodied to be manufactured in rolls or spooled so that it can be applied to conduit accordingly.

Figure 4:
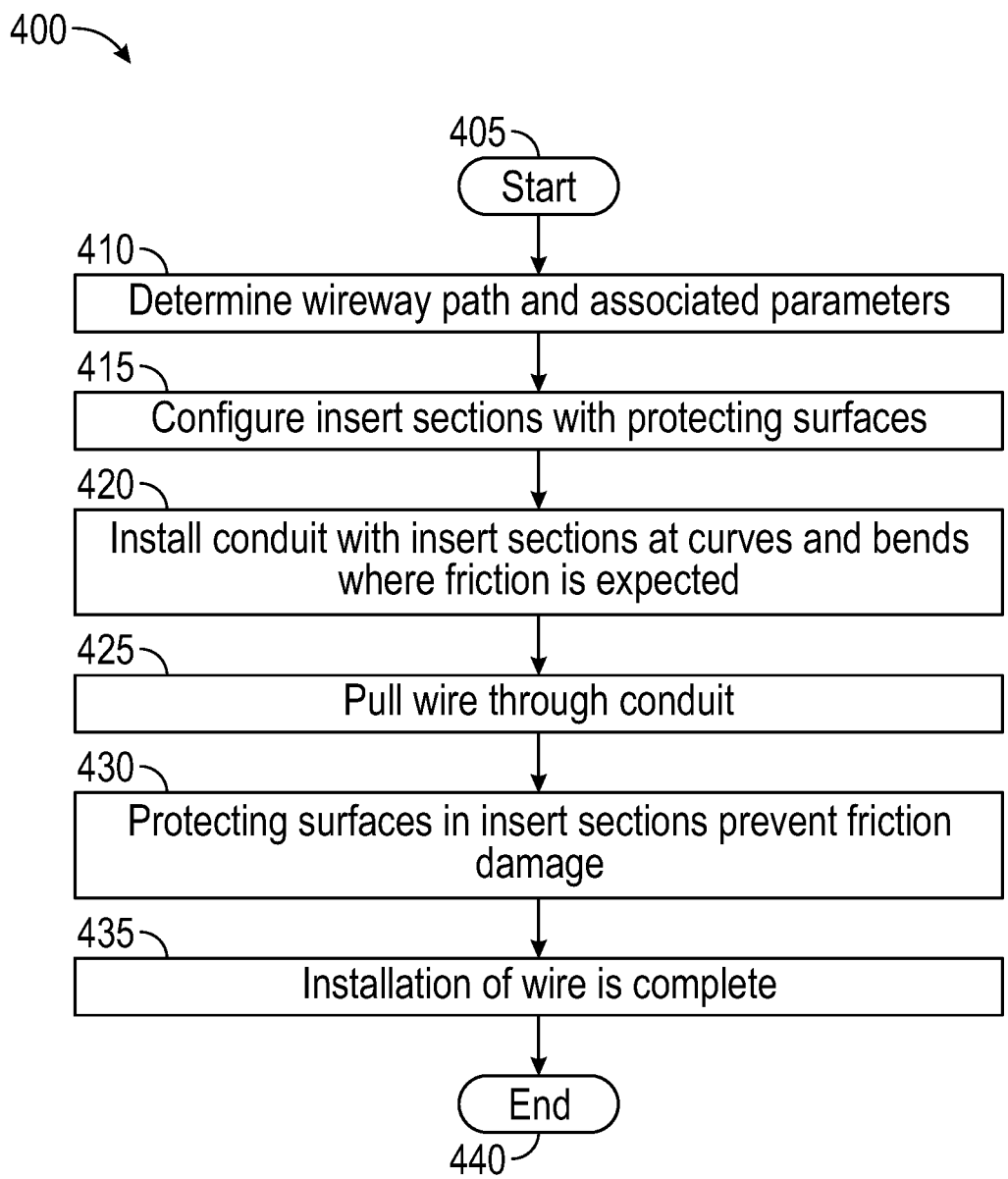
FIG. 4 depicts steps associated with a method for protecting conduit during wire installation, in accordance with the disclosed embodiments.

FIG. 4 illustrates a method 400 for installing wire without damaging associated conduit in accordance with the disclosed embodiments. The method begins at 405. At step 410 the wireway path for a wire installation project can be determined. In certain embodiments, this can include engineering an appropriate wireway path. Associated parameters can include conduit type, conduit diameter, number of wires, wire gauges, number of curves, angles and bends, the angular measurement for each of the curves, angles, or bends, etc.

At step 415 appropriate insert sections can be configured, based on the wireway path. This can include insert sections with varying shapes, sizes, materials, and thicknesses as detailed herein. The insert sections can be configured with protecting, as disclosed herein, as required for the installation design. Once the appropriate insert sections have been configured, the conduit can be installed as illustrated at step 420. The insert sections can be used at bends where friction is expected.

Next at step 425 wire can be pulled through the conduit. The protecting surfaces in the insert sections prevents damage to the conduit from friction as the wire is pulled through the conduit as illustrated at step 430. At this point the wire installation is complete at 435 and the method ends at 400.

Based on the foregoing, it can be appreciated that a number of embodiments, preferred and alternative, are disclosed herein. In an embodiment, a system comprises a section of conduit and at least one protecting surface configured on an inner surface of the section of conduit. In an embodiment, the section of conduit further comprises a bend between a first end and a second end in the section of conduit. In an embodiment, the section of conduit further comprises a polyvinyl chloride tube.

In an embodiment, the system comprises an insert notch in a surface of the section of conduit, wherein the at least one protecting surface is configured in the insert notch.

In an embodiment, the at least one protecting surface comprises at least one of hard plastic, polyvinyl chloride, resin, epoxy, metal, fiberglass, Kevlar, carbon fiber, cloth, leather, ceramic, rubber, glass, wood, and stone.

In an embodiment, the system further comprises a lubricating coating disposed on the protecting surface.

In an embodiment, the at least one protective surface comprises a surface of a thickness between $1/64$ inch and $1/2$ inch. In an embodiment, the protective surface is configured on an inner curve of the section of conduit.

In an embodiment, the system further comprises an indicator material configured beneath the at least one protecting surface. In an embodiment, the indicator material comprises at least one of a paint layer, dye packet, and dye layer.

In an embodiment, the section of conduit is configured for instillation of wire in a building.

In another embodiment, a conduit protection system comprises a section of conduit, a protecting surface configured on an inner surface of the section of conduit, and an insert notch in the section of conduit, wherein the protecting surface is configured in the insert notch. In an embodiment, the section of conduit further comprises a bend between a first end and a second end in the section of conduit. In an embodiment, the section of conduit further comprises a polyvinyl chloride tube. In an embodiment, the protecting surface comprises at least one of: hard plastic, polyvinyl chloride, resin, epoxy, metal, fiberglass, Kevlar, carbon fiber, cloth, leather, ceramic, rubber, glass, wood, and stone. In an embodiment, the system comprise a lubricating coating disposed on the protecting surface. In an embodiment, the protective surface is configured on an inner curve of the section of conduit.

In another embodiment, a method for protecting conduit during wire installation comprises selecting at least one section of a conduit with a protecting surface, installing a conduit wire chase wherein the at least one selected section of conduit is installed, and pulling wire through the conduit wherein the protecting surface prevents damage to the conduit. In an embodiment the method for protecting conduit during wire installation further comprises identifying an indicator on the wire deposited by an indicator material configured beneath the at least one protecting surface. In an embodiment of the method for protecting conduit during wire installation, the protecting surface comprises at least one of: hard plastic, polyvinyl chloride, resin, epoxy, metal, fiberglass, Kevlar, carbon fiber, cloth, leather, ceramic, rubber, glass, wood, and stone.

It will be appreciated that variations of the above-disclosed and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the following claims.

What is claimed is:

1. A system comprising:
    a section of conduit;
    an insert notch formed in an inner surface of the section of conduit;

at least one protecting surface configured in the insert notch in the inner surface of the section of conduit, wherein the inner surface and at least one protecting surface form a continuous smooth inner surface.

2. The system of claim 1 wherein the section of conduit further comprises:
a bend between a first end and a second end in the section of conduit, wherein the bend in the section of conduit between the first end and the second end has a continuous outer surface.

3. The system of claim 1 wherein the section of conduit further comprises:
a polyvinyl chloride tube.

4. The system of claim 1 wherein the insert notch in the inner surface of the section of conduit is sized to allow the at least one protecting surface to fit in the insert notch.

5. The system of claim 1 wherein the at least one protecting surface comprises at least one of:
hard plastic;
polyvinyl chloride;
resin;
epoxy;
metal;
fiberglass;
poly-paraphenylene terephthalamide;
carbon fiber;
leather;
ceramic;
rubber;
glass;
wood; and
stone.

6. The system of claim 1 further comprising:
a lubricating coating disposed on the at least one protecting surface.

7. The system of claim 1 wherein the at least one protecting surface comprises:
a surface of a thickness between 1/64 inch and 1/2 inch.

8. The system of claim 1 wherein the at least one protecting surface is configured on an inner curve of the section of conduit.

9. The system of claim 1 further comprising:
an indicator material configured beneath the at least one protecting surface, wherein the indicator material is configured to be deposited on a wire when the wire breaches the at least one protecting surface.

10. The system of claim 9 wherein the indicator material comprises at least one of:
a paint layer;
dye packet; and
dye layer.

11. The system of claim 1 wherein the section of conduit is configured for instillation of wire in a building.

12. A conduit protection system comprising:
a section of conduit;
a protecting surface configured on an inner surface of the section of conduit;
an insert notch in the section of conduit, wherein the protecting surface is configured in the insert notch; and
a separate lubricating coating disposed on the protecting surface.

13. The conduit protection system of claim 12 wherein the section of conduit further comprises:
a bend between a first end and a second end in the section of conduit, wherein the bend in the section of conduit between the first end and the second end has a continuous outer surface.

14. The conduit protection system of claim 12 wherein the section of conduit further comprises:
a polyvinyl chloride tube.

15. The conduit protection system of claim 12 wherein the protecting surface comprises at least one of:
hard plastic;
polyvinyl chloride;
resin;
epoxy;
metal;
fiberglass;
poly-paraphenylene terephthalamide;
carbon fiber;
leather;
ceramic;
rubber;
glass;
wood; and
stone.

16. The conduit protection system of claim 12 further comprising:
a sacrificial layer disposed below the lubricating coating, on the protecting surface.

17. The conduit protection system of claim 12 wherein the protecting surface is configured on an inner curve of the section of conduit.

18. A method for protecting a conduit during wire installation comprising:
selecting at least one section of the conduit, the at least one section of the conduit configured to have an insert notch in an inner surface of the at least one section of conduit, and a protecting surface in the insert notch, wherein the inner surface and the protecting surface form a continuous smooth inner surface in the at least one section of the conduit;
installing a conduit wire chase wherein the at least one selected section of the conduit is installed; and
pulling wire through the conduit wherein the protecting surface prevents damage to the conduit.

19. The method for protecting a conduit during wire installation of claim 18 further comprising:
identifying an indicator on the wire deposited by an indicator material configured beneath the protecting surface, wherein the indicator material is configured to be deposited on the wire when the wire breaches the protecting surface.

20. The method for protecting a conduit during wire installation of claim 18, wherein the protecting surface comprises
metal.

* * * * *